Figure 1:
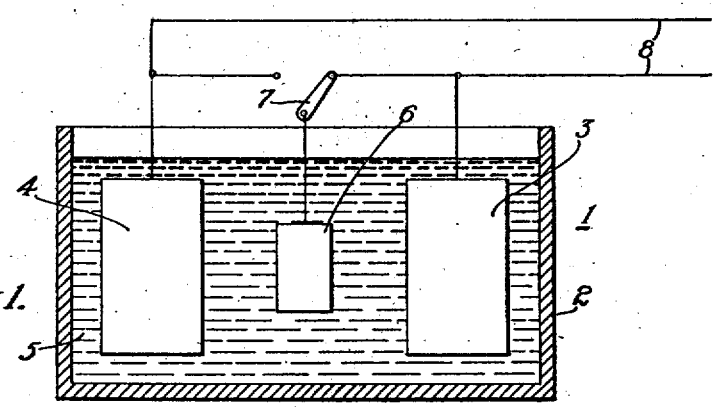

March 4, 1924.

C. T. ALLCUTT

ELECTROLYTIC CONDENSER

Filed Dec. 30, 1919

1,485,358

WITNESSES:
H.J. Shelhamer
O.E.Bee.

INVENTOR
Chester T. Allcutt
BY
Wesley G. Carr
ATTORNEY

Patented Mar. 4, 1924.

1,485,358

UNITED STATES PATENT OFFICE.

CHESTER T. ALLCUTT, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTROLYTIC CONDENSER.

Application filed December 30, 1919. Serial No. 348,371.

*To all whom it may concern:*

Be it known that I, CHESTER T. ALLCUTT, a citizen of the United States, and a resident of Pittsburgh, in the county of Allegheny and State of Pennsylvania, have invented a new and useful Improvement in Electrolytic Condensers, of which the following is a specification.

My invention relates to electrolytic condensers and it has, for its primary object, the construction of condensers which shall have a satisfactory power factor under continuous operating conditions.

It is well known to those familiar with the art that condensers, of the type formed by employing a plurality of film-forming plates immersed in a suitable electrolyte, connected in an electrical supply circuit for power-factor correction, or for other purposes, tend to deteriorate and to operate with an increased power factor or with increased losses when continuously connected in an alternating-current circuit. If this deterioration is not prevented in some manner, the condenser losses may increase, to such an extent that the condenser becomes useless for the purpose for which it is designed.

One object of my invention, therefore, resides in the provision of apparatus which shall insure satisfactory operating conditions in a condenser which is continuously connected in a supply circuit.

Another object resides in the provision of apparatus which may be employed in conjunction with an electrolytic condenser to insure good operating characteristics, which shall be simple in construction, relatively inexpensive and easily operated.

With these and other objects in view, my invention will be more fully described, illustrated in the drawings, in the several views of which corresponding numerals indicate like parts, and then particularly pointed out in the claims.

Figures 2, 3:
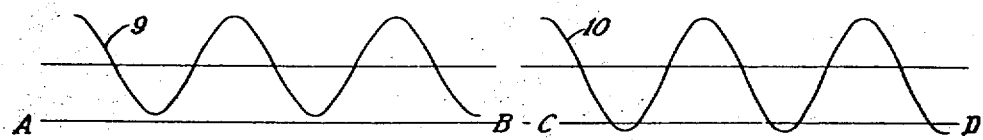

In the drawings, Fig. 1 is a diagrammatic view of an electrolytic condenser embodying my invention, and Figs. 2 and 3 illustrate conditions which obtain in a condenser constructed in accordance with my invention.

It has been found that, if an electrolytic condenser be provided with electrodes of dissimilar areas, the potential of the larger electrode thus provided is always maintained positive with respect to the electrolyte. It is desirable that the electrodes of a condenser be maintained positive with respect to the electrolyte because they do not deteriorate under such conditions, and good operating conditions, therefore, are assured.

By my invention, I provide an auxiliary electrode which is connected alternately to the main electrodes of an electrolytic condenser, thus increasing the effective area thereof. This raises the potential of first one and then the other of the main electrodes in such manner that each is alternately positive with respect to the electrolyte, while the other operates under the conditions ordinarily experienced. It follows that the main electrode which is connected to the auxiliary electrode is maintained in good condition, as long as it is so connected, while, after several days of operation, the other electrode will begin to deteriorate and the power factor of the condenser, as a whole, will tend to increase. Consequently, just before the power factor starts to increase and one main electrode begins to deteriorate, I propose to shift the connection of the auxiliary electrode to the main electrode about to deteriorate, whereby the latter will then be operated under conditions which will offset the bad effects experienced by it while the auxiliary electrode was connected to the other main electrode.

By employing an auxiliary electrode and alternately connecting it to the main electrodes, before the main electrode which is operating alone becomes deteriorated, it is possible to always maintain the condenser plates in good condition and to insure a low power factor in the condenser.

In Fig. 1 is shown a condenser 1 comprising a suitable tank 2 and a plurality of main electrodes 3 and 4, immersed in a suitable electrolyte 5. An auxiliary film-forming electrode 6 is connected to a double-throw switch 7 which may be operated to connect the auxiliary electrode in parallel relation to either of the main electrodes 3 and 4. The main film-forming electrodes 3 and 4 may be connected to an electrical supply circuit by conductors 8.

As shown in Fig. 1, the auxiliary electrode 6 is connected, by the switch 7, to the main electrode 3. Under this condition, the voltages of the plates with respect to the electrolyte are as shown in Figs. 2 and 3. The line AB in Fig. 2 represents the potential of the electrolyte and the voltage wave 9 is that of the main electrode 3, which is connected to the auxiliary electrode 6. The line CD in Fig. 3 represents the potential of the electrolyte, and the voltage wave 10 is the potential of the main electrode 4.

It will be apparent from these voltage curves that the electrode which is connected in parallel relation to the auxiliary electrode has a potential which is always above the potential of the electrolyte and that the other electrode, which is not connected to the auxiliary electrode has a potential which dips below the potential of the electrolyte at periodic intervals. It has been found,—when the potential of a condenser electrode dips below the potential of the electrolyte, that deteriorating effects are experienced on the electrode which results in an increased power factor, after several days operation. I propose, therefore, to connect the auxiliary electrode 6 to one of the main electrodes, such as the electrode 3, and allow the condenser to operate for a certain period of time, which may be two or three days, after which the auxiliary electrode should be connected to the other main electrode 4. By alternating the connections of the auxiliary electrode to the main electrodes, they are always maintained in good condition, and a low power factor obtains in the condenser.

I am aware that direct-current excitation has been provided for both of the electrodes of electrolytic condensers, but no one, so far as I am aware, has conceived the idea of alternately working the main electrodes under direct-current excitation. It is obvious that, although I have shown a manually operable switch for changing the connections of the auxiliary electrode to the main electrodes, various means of changing connections may be employed. My invention is not restricted to the particular means employed for connecting the auxiliary electrode to the main electrode, but broadly comprises alternately unbalancing the voltage conditions of the main electrodes with respect to the electrolyte at such intervals as to maintain the electrodes in good operating condition.

Although I have shown and specifically described an electrolytic condenser which embodies my invention, it is obvious that minor changes may be made in the construction thereof, without departing from the spirit and scope of my invention, and I desire, therefore, that no limitations shall be imposed except such as are indicated in the appended claims.

I claim as my invention:

1. An electrolytic condenser comprising a plurality of film-forming electrodes immersed in a suitable electrolyte and connected to an electrical supply circuit, and means for adding additional electrode surface to the electrodes alternately.

2. An electrolytic condenser comprising a plurality of film-forming electrodes immersed in a suitable electrolyte, means for impressing direct-current excitation on said electrodes, and means for alternately maintaining the potential of the electrodes positive with respect to the solution.

3. An electrolytic condenser comprising a plurality of main film-forming electrodes and an auxiliary electrode, all immersed in a suitable electrolyte, and means for alternately connecting the auxiliary electrode to the main electrodes at such intervals as to maintain the electrodes in good operating condition.

4. The combination with an alternating-current supply circuit and an electrolytic condenser therein comprising a plurality of main electrodes and an auxiliary electrode all immersed in a suitable electrolyte, of means for alternately connecting the auxiliary electrode to the main electrodes to maintain the potential of each of the main electrodes positive with respect to the solution for a sufficient time to insure good operating characteristics in the condenser.

In testimony whereof, I have hereunto subscribed my name this 29th day of December, 1919.

CHESTER T. ALLCUTT.